United States Patent
Takayama et al.

(10) Patent No.: US 10,410,336 B2
(45) Date of Patent: Sep. 10, 2019

(54) INSPECTION DEVICE, STORAGE MEDIUM, AND PROGRAM

(71) Applicant: AISIN SEIKI KABUSHIKI KAISHA, Kariya-shi (JP)

(72) Inventors: Munehiro Takayama, Kariya (JP); Akira Kozakai, Kariya (JP); Masataka Toda, Toyohashi (JP); Yukio Ichikawa, Ichinomiya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/472,705

(22) Filed: Mar. 29, 2017

(65) Prior Publication Data

US 2017/0309013 A1    Oct. 26, 2017

(30) Foreign Application Priority Data

Apr. 21, 2016 (JP) .................................. 2016-085357

(51) Int. Cl.
*G06T 7/00* (2017.01)
*H04N 5/225* (2006.01)

(52) U.S. Cl.
CPC ............ *G06T 7/0008* (2013.01); *G06T 7/001* (2013.01); *H04N 5/2256* (2013.01); *G06T 2207/30164* (2013.01)

(58) Field of Classification Search
CPC ........ G06T 7/0008; G06T 2207/30164; H04N 5/2256

USPC ............................................... 348/92
See application file for complete search history.

(56) References Cited

U.S. PATENT DOCUMENTS

| 2015/0103358 A1* | 4/2015 | Flascher | G01B 11/25 356/603 |
|---|---|---|---|
| 2015/0160002 A1* | 6/2015 | Nayar | G01B 11/25 356/610 |

FOREIGN PATENT DOCUMENTS

| JP | 2002-148195 | 5/2002 |
|---|---|---|
| JP | 2012-83239 | 4/2012 |
| JP | 2014-219346 | 11/2014 |

* cited by examiner

*Primary Examiner* — Ayman A Abaza
(74) *Attorney, Agent, or Firm* — Oblon, McClelland, Maier & Neustadt, L.L.P.

(57) ABSTRACT

An inspection device includes: an irradiation unit irradiating an inspection target with light by causing a predetermined position within a display screen to emit light; a captured image acquisition unit acquiring a captured image obtained by imaging the inspection target; a calculation unit calculating coordinates in the display screen corresponding to coordinates in the captured image on the basis of light emission position coordinate information and light reception position coordinate information indicating coordinates of a light emission position and a light reception position; and an inspection pattern creation unit creating an inspection pattern which is displayed on the display screen so that first patterns and second patterns are alternately arranged in the captured image and which is used to inspect presence a defect on a surface of the inspection target, on the basis of a calculation result of the calculation unit.

3 Claims, 4 Drawing Sheets

INSPECTION DEVICE, STORAGE MEDIUM, AND PROGRAM

CROSS REFERENCE TO RELATED APPLICATIONS

This application is based on and claims priority under 35 U.S.C. § 119 to Japanese Patent Application 2016-085357, filed on Apr. 21, 2016, the entire contents of which are incorporated herein by reference.

Technical Field

This disclosure relates to an inspection device that inspects the presence or absence of a defect on a surface of an inspection target, a storage medium that stores a program used in the inspection device, and the program.

Background Discussion

For example, in a process of manufacturing a product, irregularities that are not assumed in design may be formed on the surface of the product. Such irregularities cause a defect in terms of the quality of the product. In addition, coating may be applied to the surface of the product, which may cause a defect in a coating process, such as a coating material remaining on the surface of the product in a granular state, the coating being applied from above dust, or the coating not being applied in a uniform thickness. Also in this case, irregularities that are not assumed in design are formed on the surface of the product, which causes a defect in terms of the quality of the product. Consequently, a technique for inspecting the presence or absence of such a defect has been used in the related art (for example, JP 2012-83239A (Reference 1), JP 2014-219346A (Reference 2), and JP 2002-148195A (Reference 3)).

A method of inspecting a defect on a coated surface which is disclosed in Reference 1 includes a step of irradiating a coated surface of an inspection target with irradiation light having a striped bright-and-dark pattern in which bright patterns and dark patterns are alternately arranged, a step of acquiring reflected light from the coated surface as an image by an imaging device, and an image processing step of distinguishing between the influence of foreign substances or alien substances in the coated surface and a defect of irregularities on the coated surface, from luminance information in the acquired image.

A surface inspection method disclosed in Reference 2 includes obliquely projecting a striped pattern onto the surface of an inspection target while moving the inspection target, and capturing a reflected image of lattice stripes by a line CCD to thereby inspect the surface of the inspection target. In this surface inspection method, a phase difference image between a captured image obtained by imaging the lattice stripes and a standard pattern image which is set in advance is calculated, and individual difference components of the inspection target are separated from the calculated phase difference image, thereby acquiring a corrected phase difference image. A defect on the surface of the inspection target is detected on the basis of the corrected phase difference image acquired in this manner.

A surface inspection device disclosed in Reference 3 includes illumination means that illuminates a test subject with a bright-and-dark pattern which is set to have a dimension smaller than a planar dimension of a surface defect having a repetitive pitch assumed, imaging means that captures an image of the test subject irradiated with the bright-and-dark pattern, and image analysis means that detects a surface defect of the test subject by analyzing a distortion of a bright-and-dark pattern of an original image captured by the imaging means and the degree of changes in brightness of a bright portion and a dark portion.

In general, in a case where the presence or absence of a defect on the surface of a product is inspected using a striped pattern or a bright-and-dark pattern (hereinafter, referred to as a "bright-and-dark pattern") as in the techniques disclosed in Reference 1, Reference 2, and Reference 3, captured images obtained by imaging an inspection target having the bright-and-dark pattern projected thereon are sequentially stored while sliding the bright-and-dark pattern projected onto the inspection target, and the inspection is performed on the basis of a synthesized image obtained by superimposing images, generated by performing predetermined image processing (for example, edge emphasis processing) on the captured images, on each other. For example, a defect on the surface of the inspection target results in a distortion caused by the defect or a change in luminance in the synthesized image (there is a difference between a distortion or luminance in a portion having a defect and a distortion or luminance in a portion having no defect). In the techniques disclosed in Reference 1, Reference 2, and Reference 3, the presence or absence of a defect is inspected using such a distortion or change in luminance.

However, the distortion or change in luminance in the captured image may also occur due to the shape of the inspection target. For this reason, when the surface of the inspection target is a substantially flat surface, the inspection can be appropriately performed on the basis of the above-described distortion or change in luminance. However, in a case where a surface having a plurality of portions with different radiuses of curvature is simultaneously irradiated with a bright-and-dark pattern, the bright-and-dark patterns or luminance in the captured images may be different from each other in each other's surfaces, regardless of the absence of a defect on the surface of the inspection target depending on the posture of the inspection target, and thus it is difficult to appropriately perform the inspection. Consequently, in a case where the presence or absence of a defect on the surface having a plurality of portions with different radiuses of curvature is inspected, the inspection is performed while changing the position or posture of the inspection target so as to reduce a distortion of the bright-and-dark pattern or a change in luminance due to the shape of the inspection target, which results in an increase in time required for the inspection.

Thus, a need exists for an inspection device which is not susceptible to the drawback mentioned above.

SUMMARY

A feature of an inspection device according to an aspect of this disclosure resides in that the inspection device includes an irradiation unit that irradiates an inspection target with light by causing a predetermined position within a display screen to emit light, a captured image acquisition unit that acquires a captured image obtained by imaging the inspection target irradiated with the light, a calculation unit that calculates coordinates in the display screen corresponding to coordinates in the captured image on the basis of light emission position coordinate information indicating coordinates of a light emission position of the light in the display screen and light reception position coordinate information indicating coordinates of a light reception position of the light in the captured image, and an inspection pattern creation unit that creates an inspection pattern which is displayed on the display screen so that first patterns having brightness equal to or higher than a predetermined brightness and second patterns having brightness lower than the brightness of the first pattern are alternately arranged in the captured image and which is used to inspect presence or absence of a defect on a surface of the inspection target, on the basis of a calculation result of the calculation unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An inspection device disclosed here can shorten time required for the inspection of the presence or absence of a defect on the surface of an inspection target, as compared with a device of the related art. Hereinafter, an inspection device 1 according to this embodiment will be described.

Figure 1:
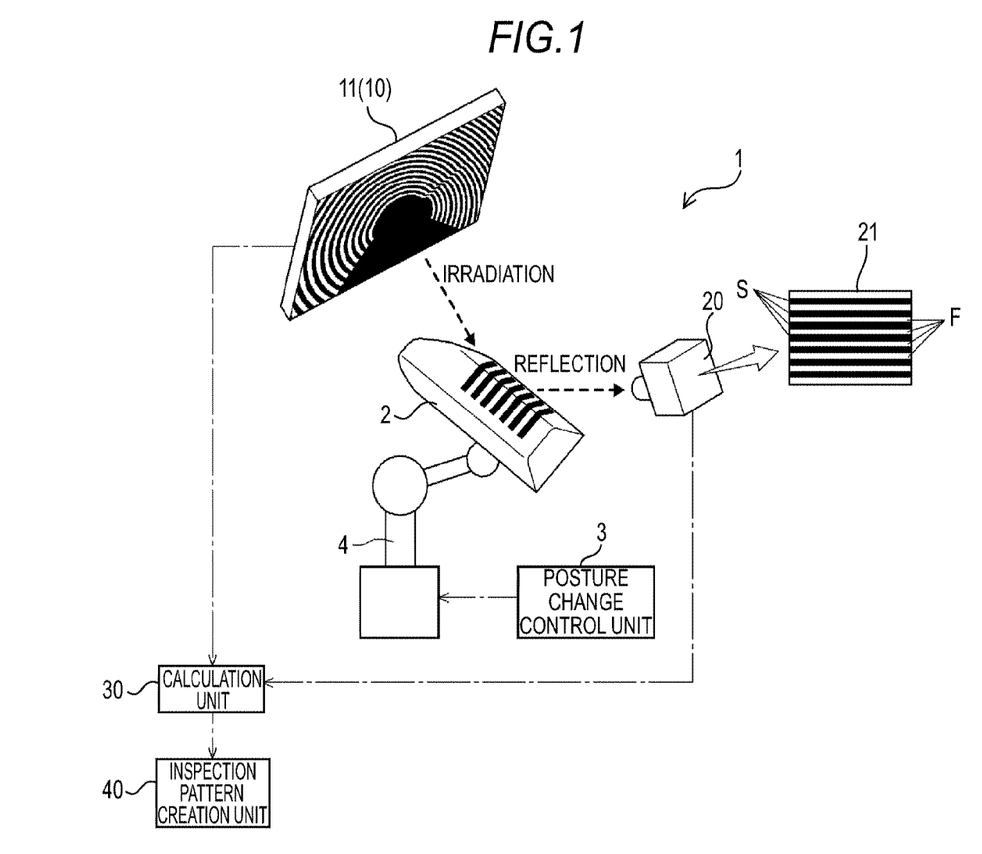
FIG. 1 is a schematic diagram illustrating a configuration of an inspection device.

FIG. 1 is a schematic diagram illustrating a configuration of the inspection device 1 according to this embodiment. As illustrated in FIG. 1, the inspection device 1 is configured to include an irradiation unit 10, a captured image acquisition unit 20, a calculation unit 30, and an inspection pattern creation unit 40.

The irradiation unit 10 irradiates an inspection target 2 with light by causing a predetermined position within a display screen 11 to emit light. The irradiation unit 10 irradiates the inspection target 2 with light when inspecting the presence or absence of a defect on the surface of the inspection target 2 and creating an inspection pattern for performing the inspection. The irradiation unit 10, which is configured to include a display unit such as a liquid crystal display or an organic EL display, performs predetermined display on the display screen 11 of the display unit to cause the display screen to emit light, thereby irradiating the inspection target 2 with light.

The captured image acquisition unit 20 acquires a captured image 21 (to be described later) obtained by imaging the inspection target 2 which is irradiated with light. Here, when the surface of the inspection target 2 inspected by the inspection device 1 is smooth or coating or the like is applied to the surface, light is reflected from the surface of the inspection target 2 in a case where the surface is irradiated with light by the irradiation unit 10. The captured image acquisition unit 20 acquires the captured image 21 obtained by imaging the inspection target 2 in a state of reflecting light. The captured image acquisition unit 20 can be configured using an imaging device such as a CMOS image sensor or a CCD image sensor.

The calculation unit 30 calculates coordinates in the display screen 11 corresponding to coordinates in the captured image 21 on the basis of light emission position coordinate information indicating coordinates of a light emission position of light in the display screen 11 and light reception position coordinate information indicating coordinates of a light reception position of light in the captured image 21. Here, the display screen 11 is sectioned according to predetermined sizes as illustrated in (A) of FIG. 2, and a region obtained by the sectioning is defined by coordinates. This sectioning may be performed in units of pixels of the display screen 11, or may be performed using one aggregate constituted by a plurality of pixels as a unit region.

Here, in a case where the inspection device 1 creates an inspection pattern, the irradiation unit 10 causes the light emission position to emit light while sequentially moving the light emission position for each region mentioned above, and the captured image acquisition unit 20 acquires a captured image whenever the light emission position is moved. At this time, information indicating coordinates for specifying the light emission position is equivalent to the light emission position coordinate information. For this reason, the light emission position coordinate information is transmitted to the calculation unit 30 from the irradiation unit 10.

On the other hand, information indicating coordinates for specifying the light reception position of light in the captured image 21 is equivalent to the light reception position coordinate information. The coordinates for specifying the light reception position may be calculated by the captured image acquisition unit 20, and may be calculated by the calculation unit 30 by using the captured image 21 acquired by the captured image acquisition unit 20. For this reason, the light emission position coordinate information is transmitted to the calculation unit 30 from the irradiation unit 10 in a case where the coordinates for specifying the light reception position are calculated by the captured image acquisition unit 20, and the captured image 21 is transmitted to the calculation unit 30 from the captured image acquisition unit 20 in a case where the coordinates for specifying the light reception position are calculated by the calculation unit 30.

Figure 2:
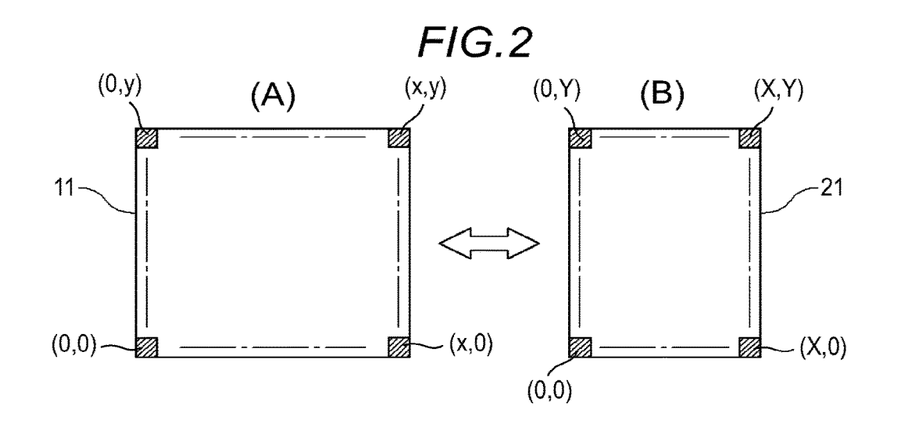
FIG. 2 is a diagram illustrating a concept of calculation of coordinates.

Here, as described above, the display screen 11 is sectioned into a plurality of regions according to predetermined sizes. In this embodiment, the captured image 21 is sectioned into a plurality of regions according to predetermined sizes as illustrated in (B) of FIG. 2, similar to the display screen 11. In the example of FIG. 2, the display screen 11 is sectioned by x wide and y long, and the captured image 21 is sectioned by X wide and Y long. For this reason, the wording "calculation of the coordinates in the display screen 11 corresponding to the coordinates in the captured image 21" means the determination of regions, among a plurality of regions sectioned according to predetermined sizes in the captured image 21, which correspond to the individual regions sectioned according to predetermined sizes in the display screen 11. Such calculation can be performed by causing the irradiation unit 10 to cause each region in the display screen 11 to emit light and specifying coordinates of the region having received light in the acquired captured image. Meanwhile, X and x may be the same unit (pixel, mm, or the like), and may different units. In addition, both Y and y may be the same unit, or may be different units.

The inspection pattern creation unit 40 creates an inspection pattern for inspecting the presence or absence of a defect on the surface of the inspection target 2, on the basis of a calculation result of the calculation unit 30. The inspection pattern is displayed on the display screen 11 so that first patterns F having brightness equal to or higher than a predetermined brightness and second patterns S having brightness lower than the brightness of the first pattern F are alternately arranged in the captured image 21. The calculation result of the calculation unit 30 means a result of calculation of the coordinates in the display screen 11 corresponding to the coordinates in the captured image 21, and is transmitted to the inspection pattern creation unit 40 from the calculation unit 30. The wording "first patterns F having brightness equal to or higher than a predetermined brightness" is equivalent to a display object which is displayed with brightness equal to or higher than the predetermined brightness in the captured image 21, for example, a display object constituted by a white color. On the other hand, the wording "second patterns S having brightness lower than the brightness of the first pattern F" is equivalent to a display object which is displayed having brightness lower than the brightness of the first pattern F in the captured image 21, for example, a display object constituted by a black color. Hereinafter, in order to facilitate understanding, a description will be given on the assumption that a pattern constituted by both the first patterns F and the second patterns S in the captured image 21 is a bright-and-dark pattern.

Figure 3:
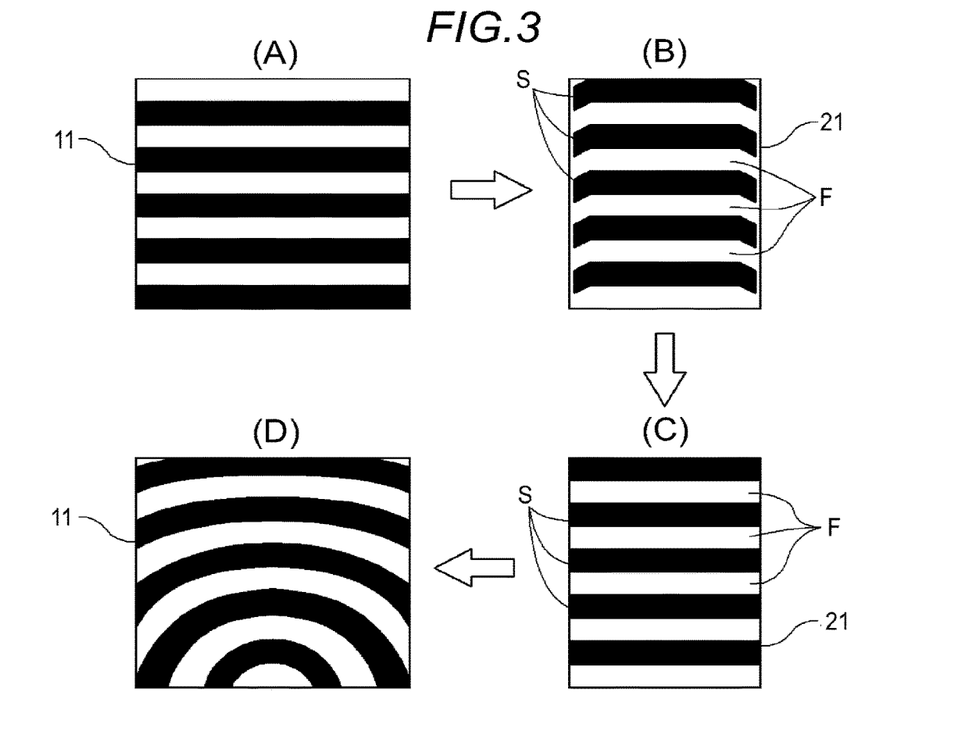
FIG. 3 is a diagram illustrating a concept of preparation of an inspection pattern.

Here, as illustrated in (A) of FIG. 3, even when a pattern having a white band-like pattern and a black band-like pattern being disposed in parallel with the same width in the display screen 11 is used as an inspection pattern, a pattern included in the captured image 21 is not limited to being the same as the inspection pattern depending on the shape of the surface of the inspection target 2. Specifically, for example, even when the surface of the inspection target 2 is a flat surface, both sides of a bright-and-dark pattern included in the captured image 21 are bent as illustrated in (B) of FIG. 3 in a case where the flat surface has an angle toward the side surfaces thereof.

In a case where the surface of the inspection target 2 to be inspected by the inspection device 1 has a defect, the bright-and-dark patterns included in the captured image 21 are not parallel to each other even when the inspection target 2 is irradiated with bright and dark patterns by the irradiation unit 10 as is well known. For this reason, as illustrated in (B) of FIG. 3, when the both sides of the patterns included in the captured image 21 are bent, it is not possible to easily inspect the presence or absence of a defect on the surface of the inspection target 2.

Consequently, in this inspection device 1, an inspection pattern is created so that the bright-and-dark patterns included in the captured image 21 are parallel to each other as illustrated in (C) of FIG. 3. In particular, in this embodiment, the inspection pattern creation unit 40 creates an inspection pattern so that the first pattern F and the second pattern S have a constant width in the captured image 21. The inspection pattern is created in this manner, and thus it is possible to make the warp of the bright-and-dark patterns due to a defect in the captured image 21 conspicuous in a case where the surface of the inspection target 2 includes the defect. Therefore, it is possible to appropriately facilitate the inspection (determination) of the presence or absence of a defect. Meanwhile, in the captured image 21, the inspection pattern having the first patterns F and the second patterns S being alternately arranged has an arc shape or has an edge (not shown) in accordance with the shape of the surface of the inspection target 2 as illustrated in (D) of FIG. 3.

Figure 4:
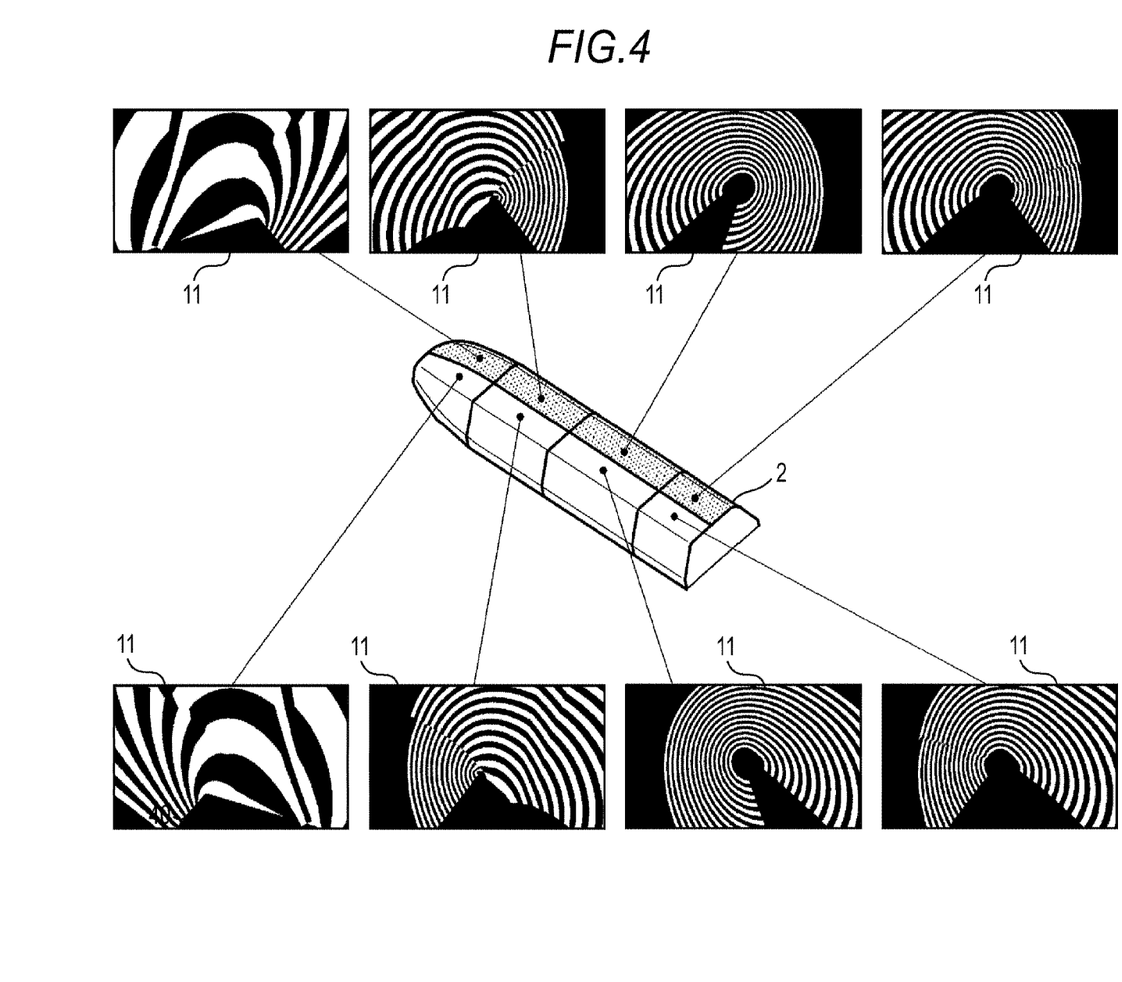
FIG. 4 is a diagram illustrating an example of the inspection pattern.

An example of the inspection pattern formed in this manner is illustrated in FIG. 4. In the example of FIG. 4, the surface of the inspection target 2 is divided into predetermined sections, and an inspection pattern is created for each of the sections obtained by the division. Specifically, the surface of the inspection target 2 is divided into eight sections, and thus eight inspection patterns are created. The inspection device 1 controls the posture change unit 4 supporting the inspection target 2 by the posture change control unit 3 to move a section corresponding to an inspection pattern to a position likely to be irradiated with the inspection pattern, and performs irradiation with the inspection pattern corresponding to the section, thereby performing inspection.

Here, in a case where the inspection pattern creation unit 40 creates an inspection pattern, the irradiation unit 10 may be configured to irradiate a region sectioned with respect to the inspection target 2 with dot-like light. Thereby, it is possible to calculate coordinates in the display screen 11 corresponding to coordinates in the captured image 21 with a high level of accuracy. Thereby, the inspection pattern can be appropriately created along the surface of the inspection target 2, and thus it is possible to inspect the presence or absence of a defect with a high level of accuracy.

In addition, for example, the irradiation unit 10 can also be configured to irradiate the inspection target 2 with linear light. In this case, the inspection target can be irradiated with light over a wide range as compared to a case where the inspection target is irradiated with dot-like light, and thus it is possible to rapidly calculate coordinates in the display screen 11 corresponding to coordinates in the captured image 21. Therefore, it is possible to rapidly create the inspection pattern.

Alternatively, the irradiation unit 10 may be configured to irradiate only a portion, in which the inspection pattern creation unit 40 cannot create an inspection pattern, with dot-like light as a result of the irradiation of the inspection target 2 with linear light. With such a configuration, it is possible to create an inspection pattern by supplementing a portion, in which an inspection pattern cannot be created by irradiation with linear light, with irradiation with dot-like light while rapidly creating an inspection pattern by irradiation with linear light.

The inspection device 1 inspects the presence or absence of a defect on the surface of the inspection target 2 on the basis of the inspection pattern created in this manner. The inspection of the presence or absence of a defect in the surface can be performed using a known technique, and thus an example thereof will be briefly described below.

First, the posture change control unit 3 sets the inspection target 2 to have a posture according to inspection. Next, the irradiation unit 10 displays an inspection pattern based on the posture on the display screen 11 to irradiate the inspection target 2 with light, and the captured image acquisition unit 20 captures an image of the surface of the inspection target 2 which is irradiated with light. Image processing is performed on the acquired captured image to detect a boundary portion between the first pattern F and the second pattern S, thereby generating a stripe edge image in which the boundary portion is drawn.

Next, the irradiation unit 10 slidingly moves the inspection pattern by a preset amount along a direction in which the first patterns F and the second patterns S are arranged, thereby generating a stripe edge image as described above. The generation of the stripe edge image is performed until the amount of sliding movement of the inspection pattern reaches a preset amount (for example, one cycle), thereby also generating a stripe edge image in the same manner. At this time, the individual stripe edge images are superimposed on each other to be synthesized whenever a stripe edge image is generated.

When the amount of sliding movement reaches the preset amount, it is determined whether there is a portion having a luminance equal to or less than a preset first threshold value, whether the luminance is greater than the first threshold value, and whether there is a portion having a luminance equal to or greater than a preset second threshold value, in the image created by superimposition. The inspection device 1 determines that the surface of the inspection target 2 has a defect in a case where there is a portion having a luminance equal to or less than the preset first threshold value and in a case where there is a portion having a luminance equal to or greater than the preset second threshold value, in the image created by superimposition.

When the presence or absence of a defect in another portion of the inspection target 2 is inspected in a case where it is not determined that the surface of the inspection target has a defect, the inspection is continued. On the other hand, in a case where it is determined that the surface of the inspection target has a defect, the inspection of the presence or absence of a defect with respect to the inspection target 2 is terminated.

Figure 5:
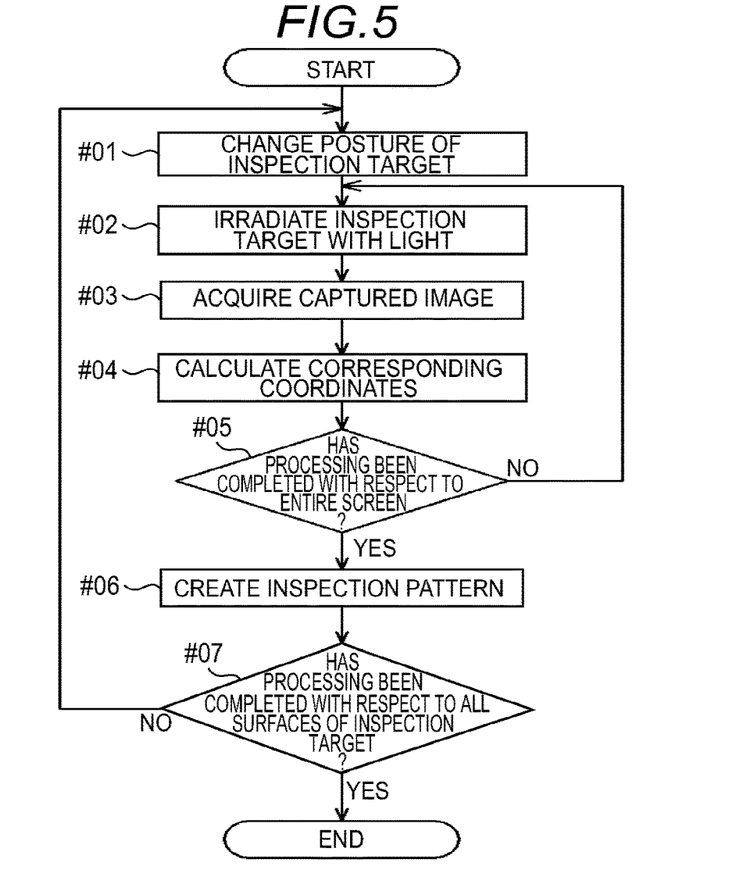
FIG. 5 is a flow chart related to the creation of the inspection pattern.

FIG. 5 illustrates a flow of the creation of an inspection pattern. A program according to the creation of the inspection pattern is given according to this flow. Hereinafter, a description will be given with reference to FIG. 5. First, the posture change control unit 3 changes the posture of the inspection target 2 to a predetermined posture by the posture change unit 4 (step #01). The wording "predetermined posture" means posture facilitating the creation of an inspection pattern.

Next, the irradiation unit 10 irradiates the inspection target 2 with light by causing a predetermined position of the display screen 11 to emit light (step #02). This processing is called an irradiation step in the program. Subsequently, the captured image acquisition unit 20 acquires a captured image obtained by imaging the inspection target 2 irradiated with light by the irradiation unit 10 (step #03). This processing is called a captured image acquisition step in the program.

The calculation unit 30 calculates coordinates in the display screen 11 corresponding to coordinates in the captured image 21 on the basis of light emission position coordinate information indicating coordinates of a light emission position of light in the display screen 11 and light reception position coordinate information indicating coordinates of a light reception position of light in the captured image 21 (step #04). This processing is called a calculation step in the program.

In a case where the processing has not been completed with respect to the entire screen in the display screen 11 (step #05: No), the flow returns to step #02 to continue the processing. In a case where the processing has been completed with respect to the entire screen in the display screen 11 (step #05: Yes), the inspection pattern creation unit 40 creates an inspection pattern which is displayed on the display screen 11 so that the first patterns F having brightness equal to or higher than the predetermined brightness and the second patterns S having brightness lower than the brightness of the first pattern F are alternately arranged in the captured image 21 and which is used to inspect the presence or absence of a defect on the surface of the inspection target 2, on the basis of a calculation result of the calculation step (step #06). This processing is called an inspection pattern creation step in the program.

In a case where the processing has been completed with respect to all surfaces to be inspected among the surfaces of the inspection target 2 (step #07: Yes), the process of creating an inspection pattern is terminated. In a case where the processing has not been completed with respect to all surfaces to be inspected among the surfaces of the inspection target 2 (step #07: No), the flow returns to step #01 to continue the processing.

Meanwhile, the above-described embodiment can be applied to a program causing a computer to execute the irradiation step, the captured image acquisition step, the calculation step, and the inspection pattern creation step, and a storage medium having the program stored therein. In addition, the storage medium may be a medium that temporarily stores the program, or may be a medium that permanently stores the program (that is, a non-transitory medium that stores the program).

Other Embodiments

In the above-described embodiment, a description has been given on the assumption that the calculation unit 30 calculates coordinates in the display screen 11 corresponding to coordinates in the captured image 21 on the basis of light emission position coordinate information indicating coordinates of a light emission position of light in the display screen 11 and light reception position coordinate information indicating coordinates of a light reception position of light in the captured image 21, but a configuration can also be adopted in which the calculation unit 30 perform calculation on the basis of three-dimensional shape data indicating coordinates of a three-dimensional shape of the inspection target 2. A schematic diagram of an inspection device 100 having such configuration is illustrated in FIG. 6.

Figure 6:
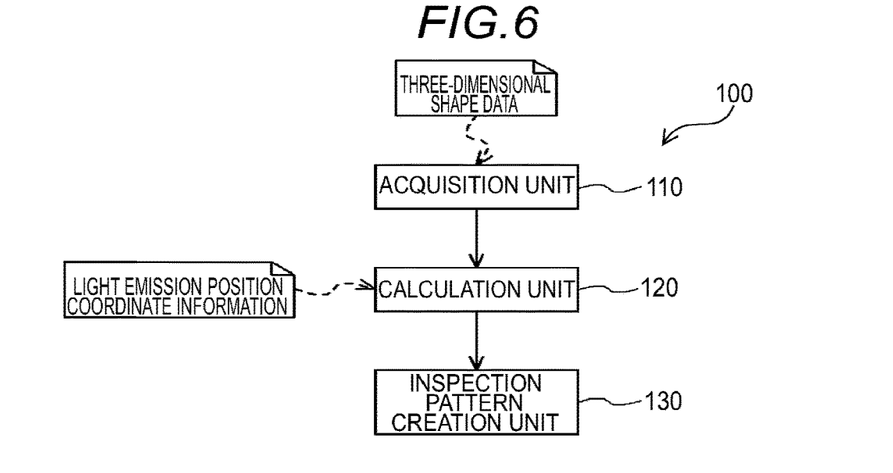
FIG. 6 is a schematic diagram illustrating a configuration of an inspection device according to another embodiment.

As illustrated in FIG. 6, in a case of this configuration, the inspection device 100 is configured to include functional units of an acquisition unit 110, a calculation unit 120, and an inspection pattern creation unit 130. The acquisition unit 110 acquires three-dimensional shape data indicating coordinates of a three-dimensional shape of an inspection target 2. The wording "three-dimensional shape data" means data such as shapes, dimensions, and the like which is used in creating the inspection target 2. Such data may be CAD data.

The calculation unit 120 calculates coordinates in a display screen 11 corresponding to coordinates in a captured image 21 in a case where it is assumed that the inspection target 2 is irradiated with light by an irradiation unit (not shown) by causing a predetermined position within a display screen 11 to emit light and the captured image 21 is acquired by imaging the inspection target 2 irradiated with light, on the basis of light emission position coordinate information indicating coordinates of a light emission position of light in the display screen 11 and three-dimensional shape data.

That is, in a case of this configuration, the calculation is actually performed without causing the irradiation unit to irradiate the inspection target 2 with light by causing the predetermined position within the display screen 11 to emit light. Therefore, the captured image 21 obtained by imaging the inspection target 2 irradiated with light is not actually acquired. The calculation unit 120 calculates coordinates in the display screen 11 corresponding to coordinates in the captured image 21 on the assumption that the inspection target is irradiated with light by the irradiation unit and the captured image 21 is acquired, on the basis of light emission position coordinate information indicating coordinates of a light emission position of light in the display screen 11 and three-dimensional shape data.

Specifically, an expression indicating a relationship between the coordinates of the inspection target 2 and the coordinates of the captured image 21, an expression indicating a relationship between individual light beams directed toward a captured image acquisition unit and the display screen 11 from the inspection target 2, and an expression indicating a relationship between the coordinates of the inspection target 2 and the display screen 11 are derived, and the posture of the display screen 11, the posture of the captured image acquisition unit, and the posture of the inspection target 2 are set, thereby calculating coordinates in the display screen 11 corresponding to coordinates in the captured image 21.

The inspection pattern creation unit 130 creates an inspection pattern which is displayed on the display screen 11 so that first patterns F having brightness equal to or higher than the predetermined brightness and second patterns S having brightness lower than the brightness of the first pattern F are alternately arranged in the captured image 21 and which is used to inspect the presence or absence of a defect on the surface of the inspection target 2, on the basis of a calculation result of the calculation unit 120. With such a configuration, it is possible to create the inspection pattern without actually irradiating the inspection target 2 with light.

In the above-described embodiment, a description has been given of an example of a case where the inspection device 1 includes one captured image acquisition unit 20, but the inspection device may also be configured to include a plurality of captured image acquisition units 20. In this case, for example, it is possible to capture images of the inspection target 2 from different directions and to reduce time required for the creation of an inspection pattern.

This disclosure can be applied for an inspection device that inspects the presence or absence of a defect on the surface of an inspection target, a storage medium that stores a program used in the inspection device, and the program.

A feature of an inspection device according to an aspect of this disclosure resides in that the inspection device includes an irradiation unit that irradiates an inspection target with light by causing a predetermined position within a display screen to emit light, a captured image acquisition unit that acquires a captured image obtained by imaging the inspection target irradiated with the light, a calculation unit that calculates coordinates in the display screen corresponding to coordinates in the captured image on the basis of light emission position coordinate information indicating coordinates of a light emission position of the light in the display screen and light reception position coordinate information indicating coordinates of a light reception position of the light in the captured image, and an inspection pattern creation unit that creates an inspection pattern which is displayed on the display screen so that first patterns having brightness equal to or higher than a predetermined brightness and second patterns having brightness lower than the brightness of the first pattern are alternately arranged in the captured image and which is used to inspect presence or absence of a defect on a surface of the inspection target, on the basis of a calculation result of the calculation unit.

With such a configuration, it is possible to create the inspection pattern capable of suppressing distortions of the first pattern and the second pattern or a change in luminance in the captured image due to the shape of the inspection target. In addition, for example, even when the inspection target includes surfaces having different radiuses of curvature, it is possible to simultaneously inspect the presence or absence of a defect on the surface of the inspection target when it is possible to acquire a captured image of a portion irradiated with the inspection pattern by the irradiation unit. Therefore, it is possible to reduce time required for the inspection of the presence or absence of a defect on the surface of the inspection target, for example, as compared with a case where the inspection is performed for each surface of the inspection target.

It is preferable that the inspection pattern creation unit creates the inspection pattern so that widths of the first pattern and the second pattern become constant in the captured image.

In a case where the inspection target is irradiated with the inspection pattern configured to include the first patterns and the second patterns, the widths of the first pattern and the second pattern may be warped on the captured image in accordance with the shape of the inspection target. For this reason, it is not easy to determine the presence or absence of a defect on the surface of the inspection target on the basis of the captured image. Consequently, with the above-described configuration, the widths of the first pattern and the second pattern become constant on the captured image regardless of the shape of the surface of the inspection target, and thus it is possible to easily determine the presence or absence of a defect on the surface of the inspection target. Therefore, it is possible to appropriately inspect the presence or absence of a defect on the surface of the inspection target.

It is preferable that the irradiation unit is configured to irradiate the inspection target with linear light.

With such a configuration, it is possible to irradiate the inspection target with light over a wide range. Therefore, the calculation of coordinates in the display screen corresponding to coordinates in the captured image can be rapidly completed, and thus it is possible to reduce time required for the inspection of the presence or absence of a defect on the surface of the inspection target.

It is preferable that the irradiation unit is configured to irradiate the inspection target with dot-like light.

With such a configuration, the inspection target can be irradiated with light for each of small regions obtained by sectioning, and thus it is possible to calculate coordinates in the display screen corresponding to coordinates in the captured image with a high level of accuracy.

The irradiation unit may be configured to irradiate only a portion, in which the inspection pattern creation unit is not capable of creating the inspection pattern, with dot-like light as a result of irradiation of the inspection target with linear light.

With such a configuration, it is possible to reduce time required for the calculation of the coordinates in the display screen corresponding to the coordinates in the captured image by irradiating the inspection target with linear light over a wide range, and it is possible to calculate the coordinates in the display screen corresponding to the coordinates in the captured image by irradiating a portion, in which it is difficult to calculate the coordinates in the display screen corresponding to the coordinates in the captured image by irradiation with linear light, with dot-like light. Therefore, it is possible to rapidly and accurately calculate the coordinates in the display screen corresponding to the coordinates in the captured image.

A feature of an inspection device according to another aspect of this disclosure resides in that the inspection device includes an acquisition unit that acquires three-dimensional shape data indicating coordinates of a three-dimensional shape of an inspection target, a calculation unit that calculates coordinates in a display screen corresponding to coordinates in a captured image in a case where it is assumed that the inspection target is irradiated with light by an irradiation unit by causing a predetermined position within the display screen to emit light and the captured image is acquired by imaging the inspection target irradiated with the light, on the basis of light emission position coordinate information indicating coordinates of a light emission position of the light in the display screen and the three-dimensional shape data, and an inspection pattern creation unit that creates an inspection pattern which is displayed on the display screen so that first patterns having brightness equal to or higher than a predetermined brightness and second patterns having brightness lower than the brightness of the first pattern are alternately arranged in the captured image and which is used to inspect presence or absence of a defect on a surface of the inspection target, on the basis of a calculation result of the calculation unit.

Even with such a configuration, it is possible to create the inspection pattern capable of suppressing distortions of the first pattern and the second pattern or a change in luminance in the captured image due to the shape of the inspection target. Therefore, it is possible to obtain the same effects as those of the above-described inspection device as an object of this disclosure.

This disclosure encompasses a storage medium that stores a program to be executed by a computer constituting the above-described inspection device, and the program includes an irradiation step of irradiating an inspection target with light by making a predetermined position within a display screen emit light, a captured image acquisition step of acquiring a captured image obtained by capturing the inspection target irradiated with the light, a calculation step of calculating coordinates in the display screen corresponding to coordinates in the captured image on the basis of light emission position coordinate information indicating coordinates of a light emission position of the light in the display screen and light reception position coordinate information indicating coordinates of a light reception position of the light in the captured image, and an inspection pattern creation step of creating an inspection pattern which is displayed on the display screen so that first patterns having brightness equal to or higher than a predetermined brightness and second patterns having brightness lower than the brightness of the first pattern are alternately arranged in the captured image and which is used to inspect presence or absence of a defect on a surface of the inspection target, on the basis of a calculation result of the calculation step.

There is no difference in a substantial configuration between the storage medium storing the program configured in this manner and the above-described inspection device as an object of this disclosure, and it is possible to obtain the above-described operational effects.

This disclosure encompasses a program to be executed by a computer constituting an inspection device, and the program includes an irradiation step of irradiating an inspection target with light by making a predetermined position within a display screen emit light, a captured image acquisition step of acquiring a captured image obtained by capturing the inspection target irradiated with the light, a calculation step of calculating coordinates in the display screen corresponding to coordinates in the captured image on the basis of light emission position coordinate information indicating coordinates of a light emission position of the light in the display screen and light reception position coordinate information indicating coordinates of a light reception position of the light in the captured image, and an inspection pattern creation step of creating an inspection pattern which is displayed on the display screen so that first patterns having brightness equal to or higher than a predetermined brightness and second patterns having brightness lower than the brightness of the first pattern are alternately arranged in the captured image and which is used to inspect presence or absence of a defect on a surface of the inspection target, on the basis of a calculation result of the calculation step.

There is no difference in a substantial configuration between the program configured in this manner and the above-described inspection device as an object of this disclosure, and it is possible to obtain the above-described operational effects.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An inspection device comprising:
an irradiation unit that irradiates an inspection target with light by causing a predetermined position within a display screen to emit light;
a captured image acquisition unit that acquires a captured image obtained by imaging the inspection target irradiated with the light; and
circuitry configured to:
calculate coordinates in the display screen corresponding to coordinates in the captured image on the basis of light emission position coordinate information indicating coordinates of a light emission position of the light in the display screen and light reception position coordinate information indicating coordinates of a light reception position of the light in the captured image;
create an inspection pattern which is displayed on the display screen so that first patterns having brightness equal to or higher than a predetermined brightness and second patterns having brightness lower than the brightness of the first pattern are alternately arranged in the captured image and which is used to inspect presence or absence of a defect on a surface of the inspection target, on the basis of a calculation result of the calculation; and
create the inspection pattern so that widths of the first pattern and the second pattern have a constant value in the captured image when a surface is without defect.

2. The inspection device according to claim 1, wherein the irradiation unit is configured to irradiate the inspection target with linear light.

3. The inspection device according to claim 1, wherein the irradiation unit is configured to irradiate the inspection target with dot-like light.

* * * * *